US008682505B2

(12) United States Patent
Christensen et al.

(10) Patent No.: US 8,682,505 B2
(45) Date of Patent: Mar. 25, 2014

(54) FLIGHT CONTROL LAWS FOR CONSTANT VECTOR FLAT TURNS

(71) Applicant: Bell Helicopter Textron Inc., Fort Worth, TX (US)

(72) Inventors: Kevin Thomas Christensen, Plano, TX (US); Shyhpyng Jack Shue, Grapevine, TX (US); Troy Sheldon Caudill, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/711,234

(22) Filed: Dec. 11, 2012

(65) Prior Publication Data
US 2014/0025237 A1    Jan. 23, 2014

Related U.S. Application Data (63) Continuation of application No. 13/391,522, filed as application No. PCT/US2011/030498 on Mar. 30, 2011, now Pat. No. 8,332,082.

(51) Int. Cl.
   *G05D 1/08*   (2006.01)
   *B64C 19/00*   (2006.01)
   *G06F 7/00*   (2006.01)

(52) U.S. Cl.
   USPC ............ 701/3; 701/4; 701/7; 244/180

(58) Field of Classification Search
   USPC ............ 701/7, 3, 4, 14, 301; 244/180, 181; 340/979
   See application file for complete search history.

(56) References Cited

U.S. PATENT DOCUMENTS

| 4,027,999 | A | * | 6/1977 | Durno ........................ 416/40 |
| 2003/0191561 | A1 | | 10/2003 | Vos | |
| 2008/0097658 | A1 | * | 4/2008 | Shue et al. ..................... 701/8 |
| 2008/0234881 | A1 | * | 9/2008 | Cherepinsky et al. ........... 701/7 |
| 2010/0324758 | A1 | * | 12/2010 | Piasecki et al. ................. 701/3 |

FOREIGN PATENT DOCUMENTS

WO    2007018572 A2    2/2007

OTHER PUBLICATIONS

International Search Report and the Written Opinion of the International Searching Authority mailed by ISA/USA, U.S. Patent and Trademark Office on Aug. 26, 2011 for corresponding International Patent Application No. PCT/US2011/030498, 7 pages.
Notice of Allowance dated Aug. 8, 2012 from counterpart U.S. Appl. No. 13/391,522.

* cited by examiner

*Primary Examiner* — Tan Q Nguyen
(74) *Attorney, Agent, or Firm* — James E. Walton; Richard G. Eldredge (57) ABSTRACT

An aircraft and method to control flat yawing turns of the aircraft while maintaining a constant vector heading across a ground surface. The aircraft includes a control system in data communication with a model, a lateral control architecture, a longitudinal control architecture, and an initialization command logic. The model decouples the directional movement of the aircraft into a lateral equation of motion and a longitudinal equation of motion. The lateral control architecture utilizes the lateral equation of motion to control the aircraft in the lateral direction, while the longitudinal control architecture utilizes the longitudinal equation of motion to control the aircraft in the longitudinal direction. The initialization command logic selectively activates the lateral control architecture and the longitudinal control architecture.

20 Claims, 9 Drawing Sheets

FLIGHT CONTROL LAWS FOR CONSTANT VECTOR FLAT TURNS

BACKGROUND

1. Field of the Invention

The present invention relates generally to flight control systems, and more particularly, to a flight control system having flight control laws which enable precise aircraft maneuvering relative to the ground.

2. Description of Related Art

Aircraft which can hover and fly at low speeds include rotorcraft, such as helicopters and tilt rotors, and jump jets, like the AV-8B Harrier and F-35B Lightning II. These aircraft can spend a large portion of their mission maneuvering relative to the ground. Sometimes, this maneuvering must be conducted in confined spaces around external hazards such as buildings, trees, towers, and power lines.

For traditional flight control systems, ground-referenced maneuvering (GRM) requires the pilot to make constant control inputs in multiple axes in order to counter disturbances caused by wind, as well as to remove the natural coupled response of the aircraft. The pilot workload during such maneuvers can become quite high since the pilot must sense un-commanded aircraft motions and then put in the appropriate control input to eliminate the disturbance. In a worst-case scenario, a pilot might be required to fly GRM in a degraded visual environment. With the lack of visual cues to detect off-axis motion, the pilot might accidentally fly into an external hazard while maneuvering in a confined space.

Traditional flight control law designs do not provide the pilot with an easy way to control aircraft crab angle during GRM. Crab angle is defined as the angle between the aircraft's heading and its actual ground path. With these prior designs, adjusting crab angle while maintaining ground track took considerable pilot concentration, since the pilot had to coordinate inputs to both the lateral and directional controllers.

Although pilots generally seek to minimize crab angle during GRM, some mission tasks may call for flat yawing turns while maintaining a constant vector across the ground. For example, on a steep approach, the pilot may need to fly with a crab angle so he or she can see the landing zone. Additionally, the pilot may want to quickly transition out of rearward or sideward flight while continuing along the same ground track. In a final example, the pilot may want to acquire and track a point on the ground without having to fly directly towards it. With prior flight control designs, such maneuvers required extraordinary pilot skill to coordinate the aircraft's motions in multiple control axes.

Although the foregoing developments represent great strides in the area of flight control laws, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the control system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

This invention will enable seamless and transient free GRM. More specifically this invention will enable a pilot to use the directional controller to command flat yawing turns at low groundspeeds, while maintaining a constant vector across the ground. The seamless integration of this design requires no manual cockpit switches to select a Constant Vector Flat Turn (CVFT) mode. Instead, the control laws will automatically adjust pitch and roll attitude to keep the aircraft moving in the same direction at a constant speed whenever the pilot inputs a directional command at low speed.

The control system of the present application enables seamless and transient free GRM without the need for manual cockpit switches. The control system utilizes relative ground-speed difference to automatically control pitch and roll attitudes so that the aircraft will maintain a constant vector during a low speed flat turn. The control system also allows the pilot to complete a CVFT with minimal workload since the ground vector will automatically be maintained by the control laws without the pilot having to use cockpit switches to change modes.

Figure 1:
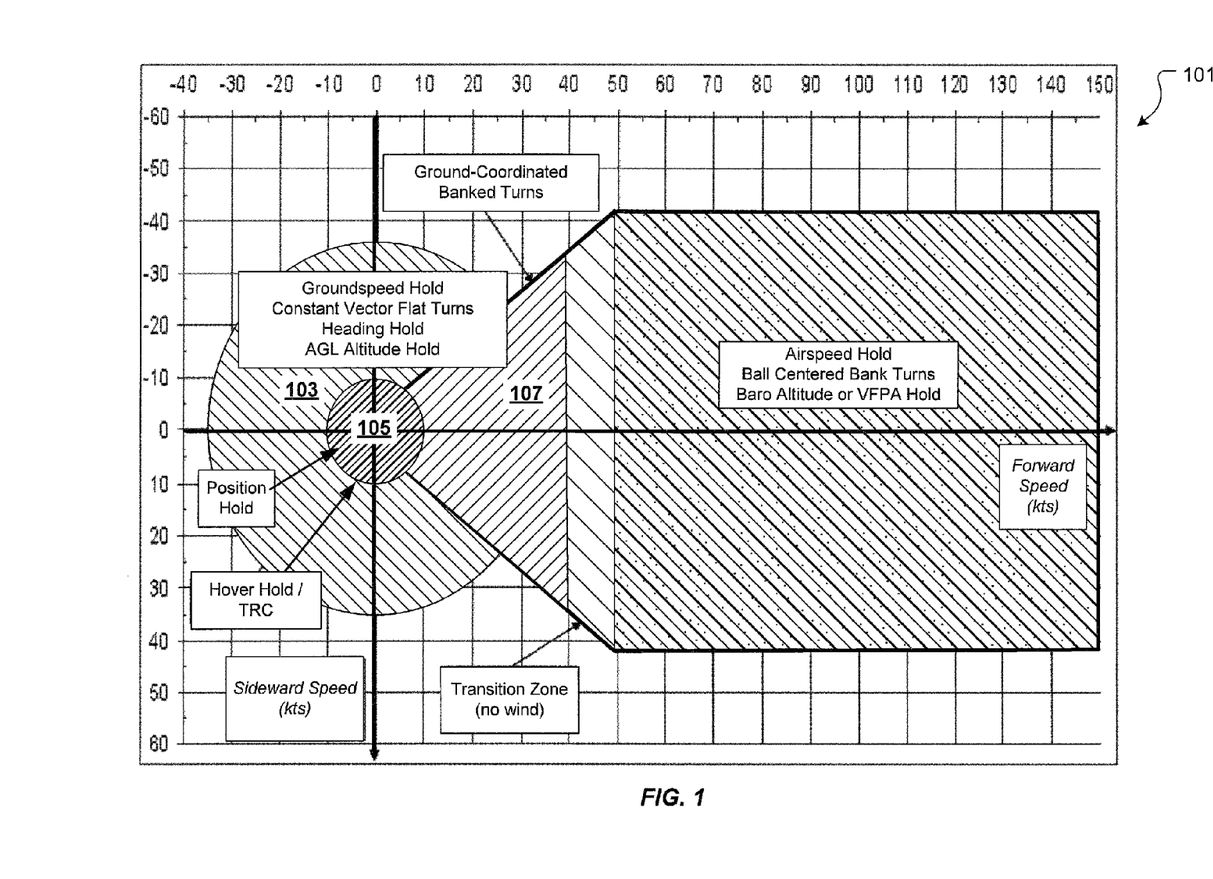
FIG. 1 is a flight envelope with control law modes designed to enable ground reference maneuvers.

Referring now to the drawings, FIG. 1 shows a representative flight envelope 101 with a plurality of control law modes designed to enable GRM. Flight envelope 101 comprises a region 103 depicting the CVFT region, wherein the CVFT region is preferably from 10 to 35 knots groundspeed in any direction relative to the aircraft's body axis. The lower bound of region 103 is set by the Hover Hold and Translational Rate Command (TRC) region 105. The upper bound of region 103 is set by the aircraft's sideward and rearward flight airspeed limits.

Figure 2:
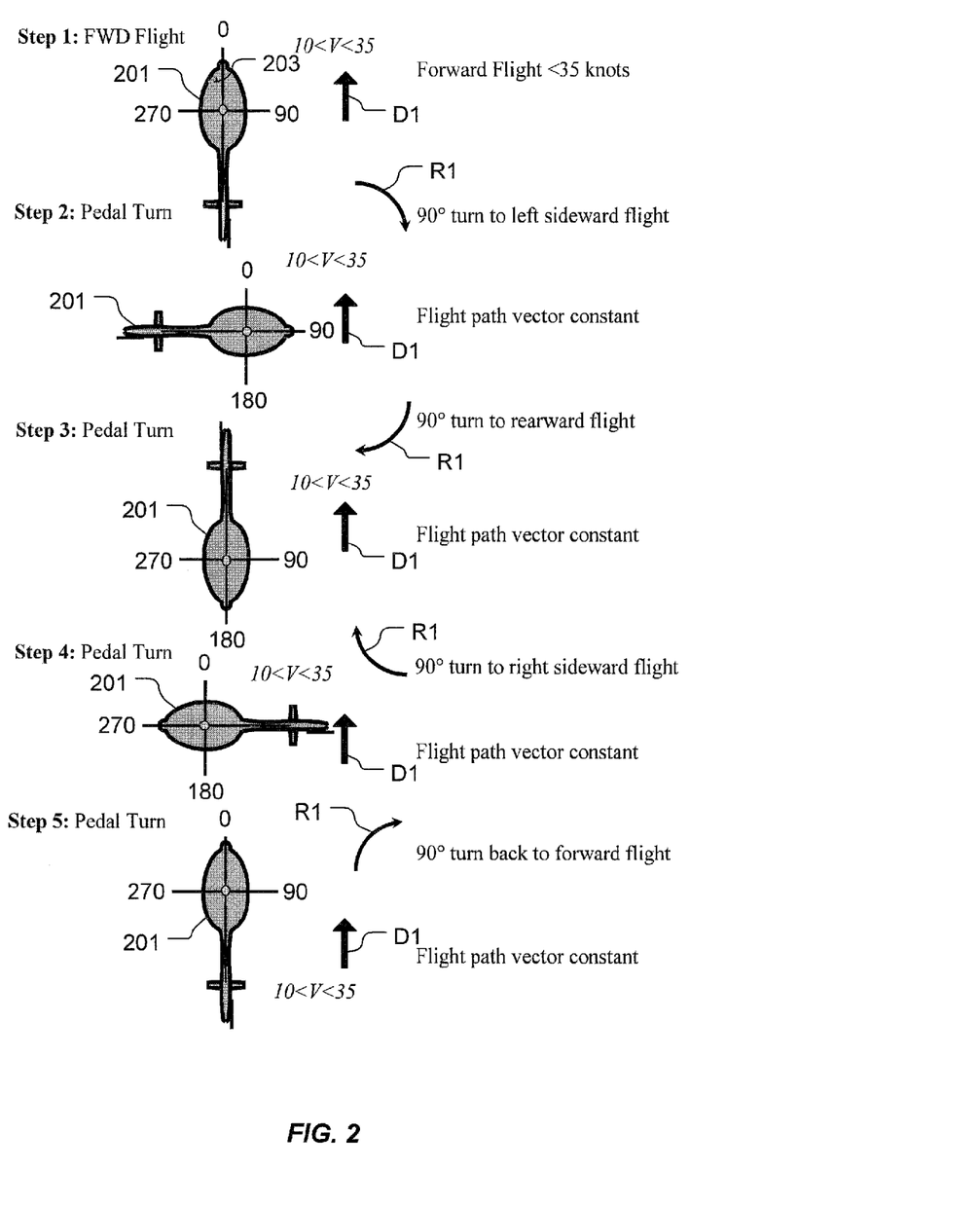
FIG. 2 is a schematic of an aircraft utilizing a control system according to the preferred embodiment of the present invention.

FIG. 2 is a schematic of an aircraft 201 utilizing a control system according to the preferred embodiment of the present invention. FIG. 2 shows aircraft 201 in forward flight within region 103. Directional inputs turn aircraft 201 in a complete 360 degree yaw movement R1, stopping every 90 degrees, and without changing the speed and flight heading of aircraft 201, as represented with arrow D1. In the preferred embodiment, the control system is utilized with rotary aircraft, i.e., a helicopter; however, it should be appreciated that the control system is easily and readily adaptable with control systems of different types of aircraft, both manned and unmanned.

FIG. 2 depicts aircraft 201 traveling between 10 to 35 knots in a forward direction. As is shown, aircraft 201 preferably turns in a yaw direction R1 at approximately 90 degrees relative to direction D1. Aircraft 201 continues to turn in direction R1 while maintaining a constant flight heading. It should be appreciated that the preferred control system is adapted to turn aircraft 201 at 90 degrees during each application; however, it should be appreciated that alternative embodiments could easily include a control system adapted to turn the aircraft at different angles, e.g., at 30 degrees in lieu of or in addition to 90 degrees. It should also be understood that although shown turning in a clockwise direction, the control system can also turn the aircraft in a counterclockwise movement.

FIG. 2 provides an exemplary depiction of aircraft 201 turning 360 degrees while maintaining forward flight. Step 1 shows aircraft 201 traveling in a constant forward flight, as depicted with arrow D1, between 10 and 35 knots. Step 2 depicts application of the control system, namely, the pilot utilizes the control system to rotate aircraft 201 in the clockwise direction approximately 90 degrees, as indicated by arrow R1. Step 2 shows aircraft 201 traveling in forward flight while the fuselage faces 90 degrees relative to the directional movement. Steps 3-5 provide further illustration of the process being repeated. In particular, each time the control system is utilized, aircraft 201 rotates 90 degrees while maintaining a constant forward heading.

Figure 3:
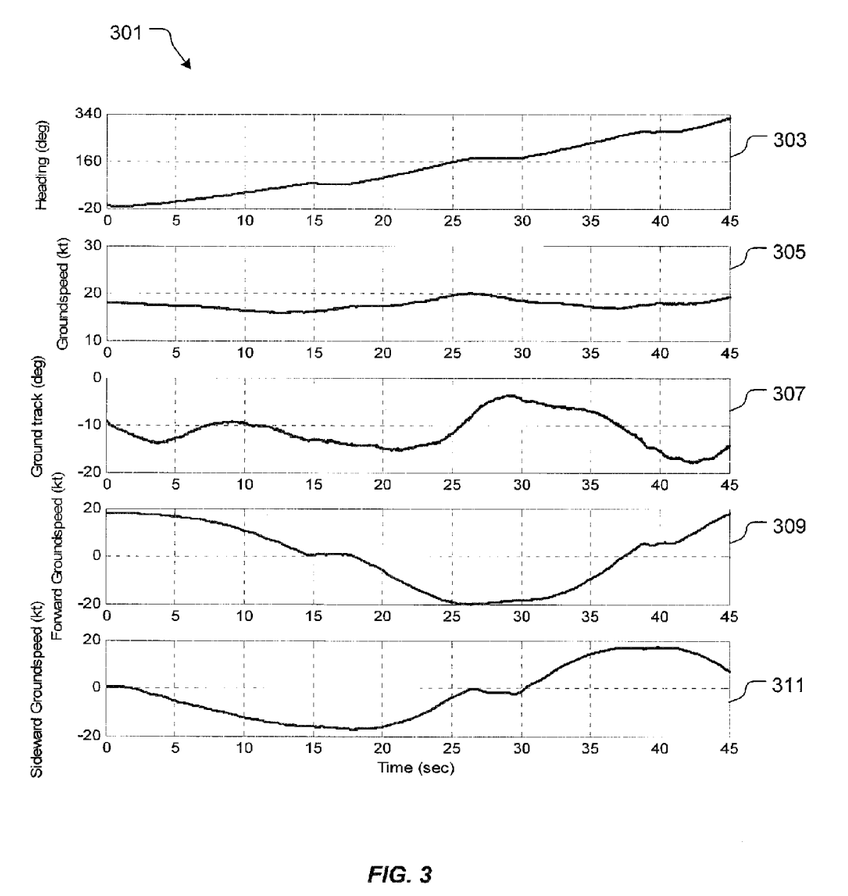
FIG. 3 is a set of plots comprising measured flight data of the aircraft of FIG. 2 while performing constant vector flat turns.

Referring now to FIG. 3 in the drawings, measured flight data 301 of aircraft 201 is shown during a 360 degree CVFT. A plot 303 provides measured data representing the turning movement R1 of aircraft 201 during the 360 degree turn. A plot 305 provides measured data representing the groundspeed of aircraft 201 during the 360 degree turn. Plot 305 shows aircraft 201 initially starting at 20 knots forward groundspeed during the entire 360 degree CVFT. Plot 305 shows that aircraft 201 holds a relatively steady groundspeed during the 360 degree CVFT. A plot 307 provides measured data representing the ground track of aircraft 201 during the 360 degree CVFT. The forward groundspeed plotted on a plot 309 essentially depicts a cosine curve during the turn, while the sideward groundspeed plotted on a plot 311 shows a sine curve.

Figure 4:
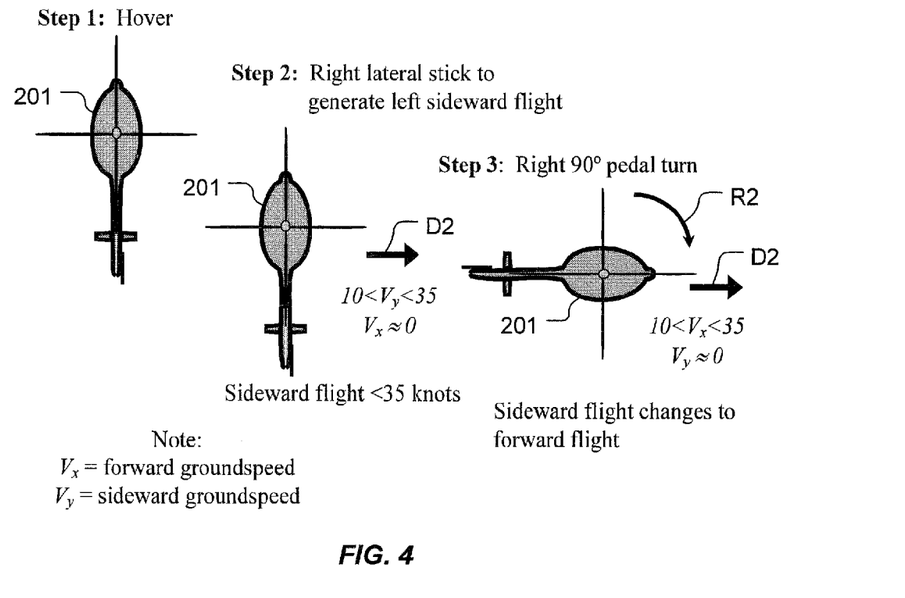
FIG. 4 is a schematic view of the aircraft of FIG. 2 changing flight heading from sideward flight to forward flight.

Referring now to FIG. 4 in the drawings, a schematic view of aircraft 201 is shown changing flight heading from sideward flight to forward flight. In the exemplary embodiment, the CVFT control system is utilized such that aircraft 201 changes heading from a forward groundspeed Vx of about 0 knots and a sideward groundspeed between 10-35 knots to a forward groundspeed between 10-35 knots and a sideward groundspeed about 0 knots. Step 1 of FIG. 4 shows aircraft 401 during hover, while a step 2 shows aircraft 401 traveling in a sideward groundspeed between 10-35 knots, as depicted with arrow D2. In step 2, a right lateral control stick (not shown) is utilized to generate a left sideward heading. Thereafter, a right 90 degree petal turn is applied to rotate aircraft 201 in a forward heading with a petal 203. In the preferred embodiment, petal 203 is a petal manipulated with the pilot's foot; however, it should be appreciated that other forms of devices, i.e, a hand switch could be utilized in lieu of or in addition to petal 203. For purposes of this invention, a lateral controller, longitudinal controller, and directional controller are characterized as petal 203 or similarly suited devices. Step 3 depicts application of the CVFT control system, wherein aircraft 201 turns 90 degrees for changing the heading of aircraft 201.

Figure 5:
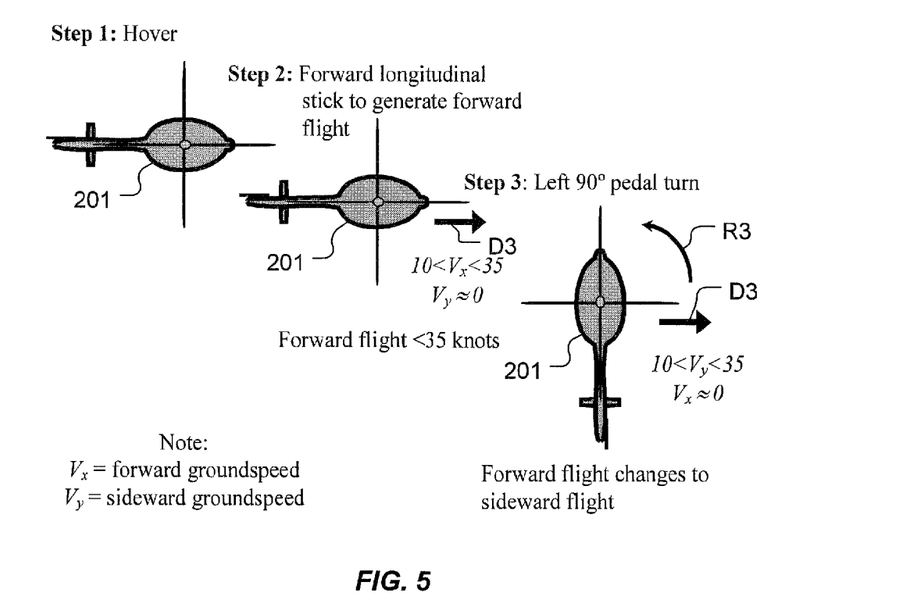
FIG. 5 is a schematic view of the aircraft of FIG. 2 changing flight heading from forward flight to sideward flight.

Referring now to FIG. 5 in the drawings, an alternative application of the CVFT control system is shown. In the exemplary embodiment, the CVFT control system is utilized to turn aircraft 201 from a forward groundspeed Vx between 10-35 knots and a sideward groundspeed of about 0 knots to a sideward groundspeed between 10-35 knots and a forward groundspeed about 0 knots. Step 1 shows aircraft 201 during hover, while a step 2 shows aircraft 201 traveling in a forward heading having a groundspeed between 10-35 knots, as depicted with arrow D3. In step 2, a forward longitudinal stick is utilized to generate forward flight. Thereafter, a left 90 degree petal turn is applied to rotate aircraft 201 such that the forward flight of aircraft 201 changes to a sideward flight heading.

Those skilled in the art will understand that the methods for aircraft guidance disclosed in this invention can be applied to any combination of the following: (1) full authority fly-by-wire flight control systems, as well as partial authority mechanical systems; (2) traditional cockpit layouts with a center stick for longitudinal and lateral control, pedals for directional control, and a collective stick for vertical control, as well as more advanced designs which combine multiple control axes into a center or side stick controller; and, (3) any aircraft capable of GRM, including both rotorcraft and jump jets.

Figure 6:
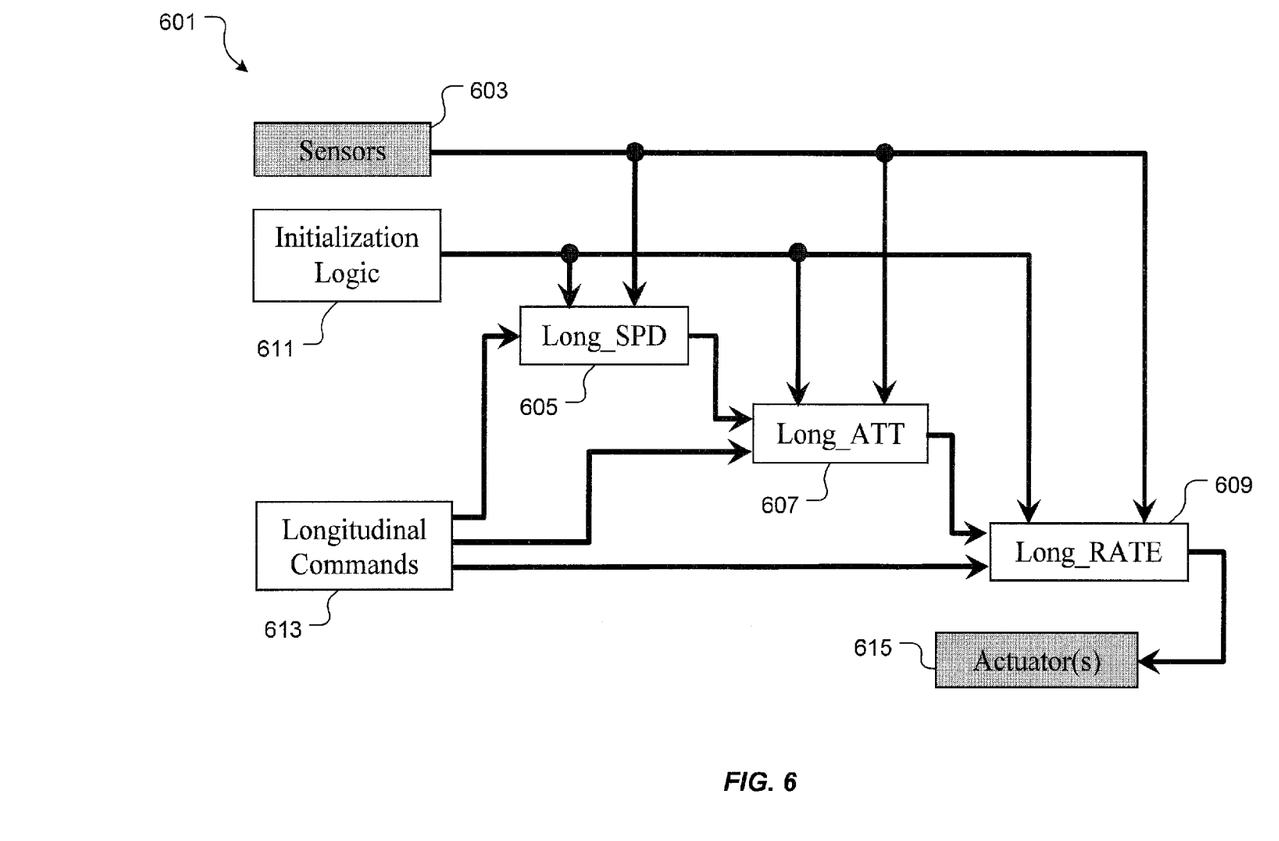
FIG. 6 is a schematic view of the control system architecture for a set of longitudinal control laws.
Figure 7:
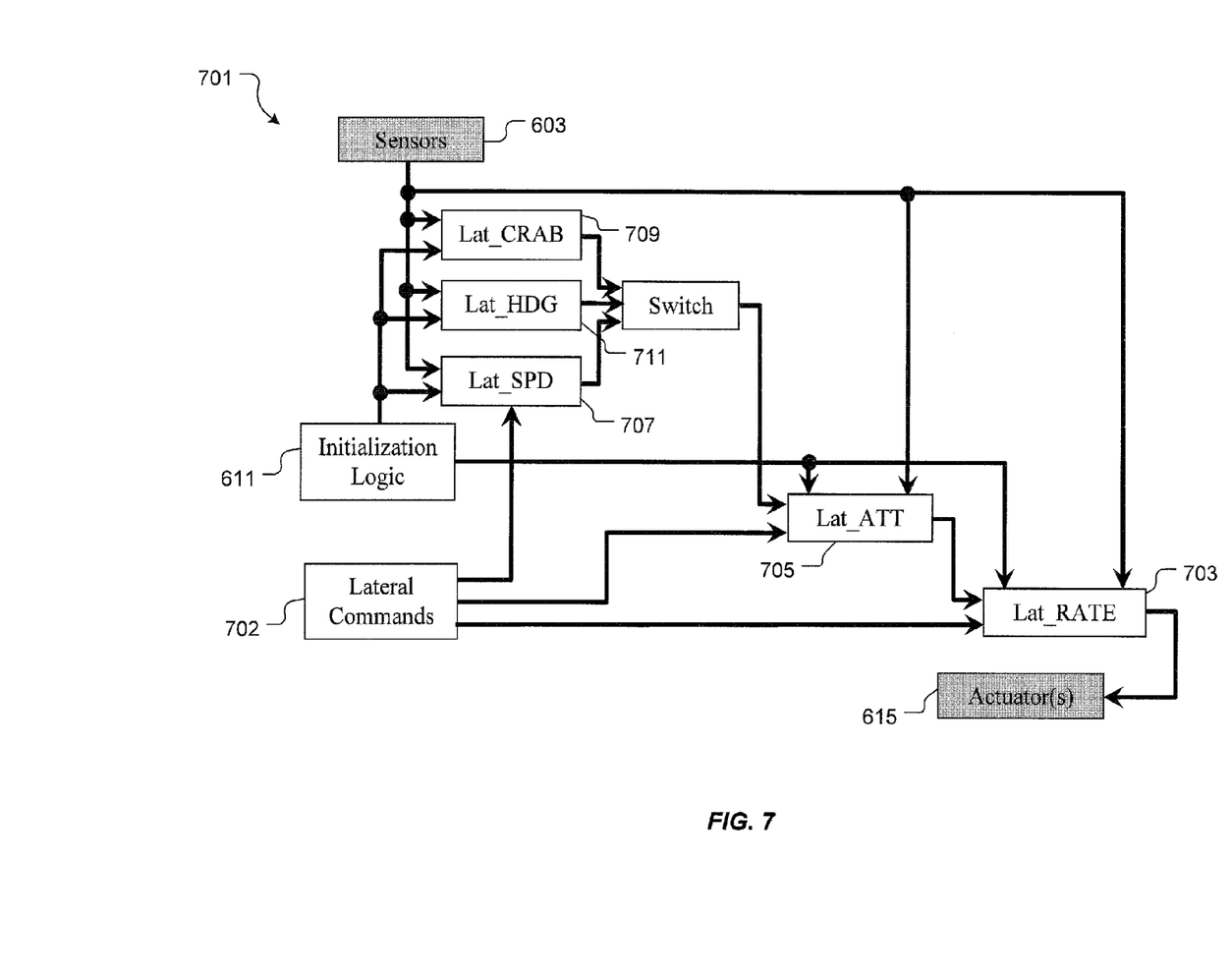
FIG. 7 is a schematic view of the control system architecture for a set of lateral control laws.
Figure 8:
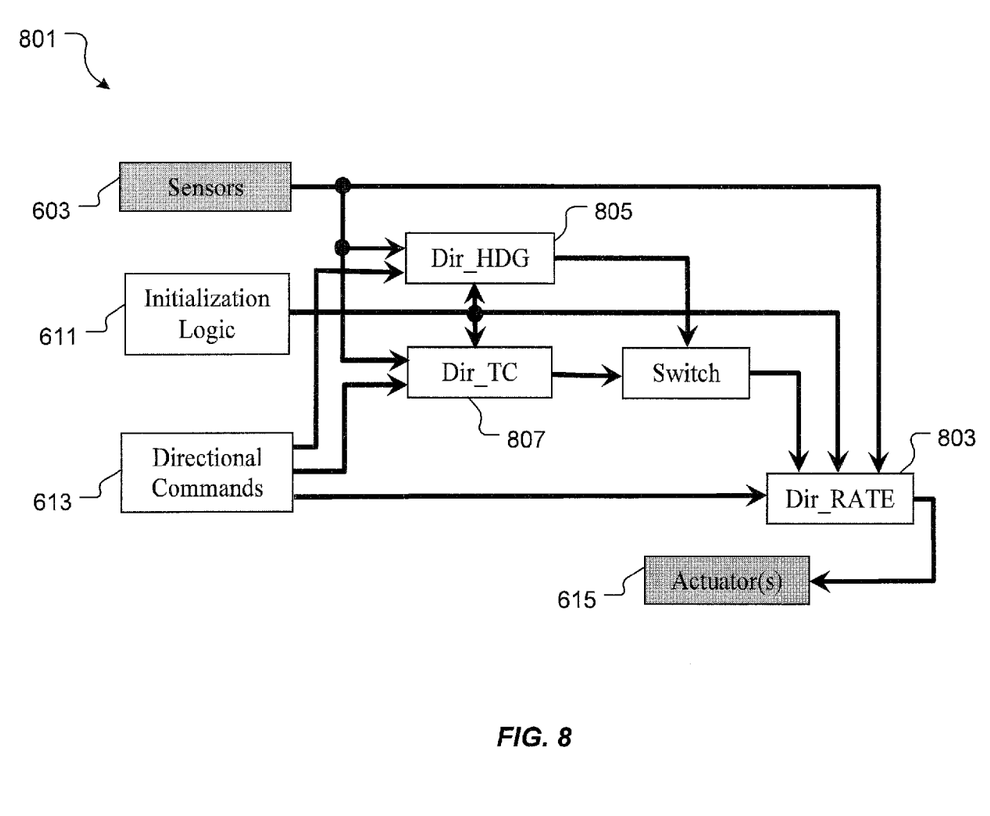
FIG. 8 is a schematic view of the control system architecture for directional control laws.

The key to enabling seamless and transient free GRM lies in the advanced control law architecture of the CVFT control system as shown in FIGS. 6 to 8. FIG. 6 shows architecture 601 of the CVFT control system operably associated with one or more longitudinal control laws, FIG. 7 shows architecture 701 of the CVFT control system operably associated with one or more lateral control laws, and FIG. 8 shows architecture 801 of the CVFT control system operably associated with one or more directional control laws according to the preferred embodiment of the invention.

Referring now to FIG. 6 in the drawings, architecture 601 includes one or more aircraft sensors 603 operably associated with the control laws to accomplish GRM. Aircraft sensors 603 can include: an inertial Navigation System (attitudes, attitude rates, and translational accelerations); a Global Positioning System (ground-referenced speeds and positions); an Air Data Computer (airspeed and barometric altitude); and, a Radar or Laser Altimeter (above ground level (AGL) altitude). An aircraft model can be obtained from aerodynamics data and a group of linear models can be developed based on its airspeed form aircraft sensors 603. These linear models include both lateral and longitudinal equations of motion. Since the aircraft model matrices are large and contain coupling terms of lateral and longitudinal motions within the matrices, it is difficult to determine the best performance control gains for all at the same time. In order to overcome these issues, the linear model of aircraft performance is decoupled first. After the aircraft model is decoupled to lateral and longitudinal equations of motion, the effect of coupling terms between lateral and longitudinal motions can be reduced to minimum, thus stabilizing the system.

In the preferred embodiment, architecture 601 preferably comprises of a longitudinal control law for forward speed, represented as block 605 "Long_SPD"; a longitudinal control law for pitch angle, represented as block 607 "Long_ATT"; and, a longitudinal control law for pitch rate, represented as block 609 "Long_RATE". Architecture 601 is further provided with initialization logic 611 adapted for determining which loop is active in each axis based on flight conditions and pilot control inputs. Logic 611 will also re-initializes inactive loops in order to eliminate control jumps when switching between the loops to provide seamless and transient free mode changes.

Architecture 601 further includes a longitudinal command 613 generated in the control laws by referencing the pilot's cockpit control input in each axis. The input to the control laws is the difference between the controller's present position and the centered, no force position, which is also referred to as the "detent" position. The control commands can also be generated by a beep switch located in the cockpit to command small and precise changes in aircraft state. The control laws process these control inputs to generate the appropriate aircraft response commands. These commands are then sent out to the control law guidance blocks to maneuver the aircraft. The control law outputs are routed to an actuator 615 for each dynamic axis. For a conventional helicopter, the control laws send control signals to the following actuators: longitudinal axis—main rotor longitudinal swashplate angle; lateral axis—main rotor lateral swashplate angle; vertical axis—main rotor collective pitch; and, directional axis—tail rotor collective pitch.

Since pitch rate is the fastest longitudinal state, Long_RATE 609 is the inner loop of the longitudinal control laws. Next, the Long_ATT 607 loop feeds the Long_RATE control law 609 loop to control pitch attitude. Finally, the Long_SPD control law 605 loop feeds the Long_ATT 607 loop to control forward speed.

When flying with the longitudinal controller in detent outside of the Hover Hold/TRC region 105, depicted in FIG. 1, the Long_SPD 605 loop will be active. At lower speeds, this loop will hold constant forward groundspeed, while at higher speeds, airspeed will be held. Once the pilot moves the longitudinal controller out of detent, the control laws can command either pitch attitude (Long_ATT 607) or pitch rate (Long_RATE 609).

Referring now to FIG. 7 in the drawings, architecture 701 comprises one or more lateral control laws operably associated with sensors 603, logic 611, lateral commands 702, and actuators 615. The lateral control laws include: a lateral control of roll rate, represented as block 703 "Lat_RATE"; a lateral control of the roll attitude, represented as block 705 "Lat_ATT"; a lateral control of sideward groundspeed, represented as block 707 "Lat_SPD"; a lateral control of the crab angle, represented as block 709 "Lat_CRAB"; and, lateral control of heading, represented as block 711 "Lat_HDG".

Similar to the longitudinal axis, Lat_RATE 703 is the inner loop of the lateral control laws and the Lat_ATT 705 loop feeds the Lat_RATE 703 loop to control roll attitude. The Lat_ATT 705 loop can be fed by one of three loops, Lat_SPD 707, Lat_CRAB 709, or Lat_HDG 711.

The crab angle used in the Lat_CRAB 709 loop is computed in the control laws using the following equation:

$$\eta = \tan^{-1}\left(\frac{V_y}{V_x}\right) \quad (1)$$

where $\eta$ is the crab angle, $V_y$ is the sideward groundspeed with right positive, and $V_x$ is the forward groundspeed. To avoid a singularity in Equation 1, $V_x$ is limited to be above the Hover Hold/TRC region 103.

When operating in the Ground-Coordinated Banked Turn (GCBT) envelope as shown by region 107 in FIG. 1, if both the lateral and directional controllers are in detent, lateral control law logic will hold crab angle through the Lat_CRAB 709 loop. If operating in the CVFT envelope, but not in the GCBT envelope, and the lateral and directional controllers are in detent, the control logic will hold sideward groundspeed constant with the Lat_SPD 707 loop. When operating at higher airspeeds with lateral and directional controllers in detent, the control logic will hold heading constant with the Lat_HDG 711 loop. When the pilot moves the lateral controller out of detent in any of these cases, the control laws can command either roll attitude (Lat_ATT 705) or roll rate (Lat_RATE 703).

Referring now to FIG. 8 in the drawings, architecture 801 comprises one or more directional control laws operably associated with sensors 603, logic 611, commands 613, and actuators 615. The directional control laws include: directional control of yaw rate, represented as block 803 "Dir_RATE"; directional control of heading, represented as block 805 "Dir_HDG"; and, directional turn coordination, represented as block 807 "Dir_TC"

Since yaw rate is the fastest directional state, Dir_RATE 803 is the inner loop of the directional control laws. This loop is fed by the Dir_HDG 805 loop to control aircraft heading at lower speeds. Unlike traditional control law designs, this invention includes an additional loop, parallel to the Dir_HDG 805 loop, to feed the Dir_RATE 803 inner loop. The Dir_TC 807 loop is used to coordinate banked turns throughout the flight envelope.

In the GCBT envelope 107 shown in FIG. 1, the Dir_TC 807 loop will control crab angle during banked turns. With no directional input, the Dir_TC 807 loop will hold crab angle at zero. Any directional control inputs during a GCBT will result in a change in crab angle in the appropriate direction. Additionally, if the aircraft is in the GCBT envelope, but above the CVFT envelope, directional controller inputs will command changes in crab angle through the Dir_TC 807 loop even in non-turning flight. In this case, once the directional controller is returned to detent, heading hold will be re-engaged (Dir_HDG 805 loop) and the crab angle will be held though the Lat_CRAB 709 loop.

When in the BCBT envelope, the Dir_TC 807 loop will automatically adjust yaw rate based on actual bank angle, true airspeed, and lateral acceleration in order to keep the slip ball centered. Any directional controller inputs in the BCBT envelope will command a change in lateral acceleration, which will subsequently result in sideslip away from the pedal input. Pedal inputs will also result in a slight roll in the direction of the input to provide lateral stability.

In the absence of lateral or directional control inputs while operating in either the GCBT or CVFT envelopes, the directional axis will hold heading through the Dir_HDG 805 loop. If the pilot moves the directional controller out of detent in the CVFT envelope with both the lateral and longitudinal controllers in detent, the directional control laws will command a yaw rate through the Dir_RATE 803 loop. In this case, the control laws will maintain a constant ground vector by using the Long_SPD 605 and Lat_SPD 707 loops.

During the CVFT, when the directional controller is first moved out of detent, the control laws will capture the aircraft's current groundspeed in the earth axis coordinate system. The control laws keep track of the difference between the aircraft's actual groundspeed and the captured groundspeed. This relative groundspeed difference is converted from the earth axis to the aircraft's body axis using the following equations:

$$\Delta V_x = \Delta V_{north} \cdot \cos \psi + \Delta V_{east} \cdot \sin \psi \quad (2)$$

$$\Delta V_y = \Delta V_{east} \cdot \cos \psi - \Delta V_{north} \cdot \sin \psi \quad (3)$$

where $\Delta V_x$ is the groundspeed difference in the body axis forward direction, $\Delta V_y$ is the groundspeed difference in the body axis sideward direction with right positive, $\Delta V_{north}$ is the groundspeed difference in the earth axis north direction, $\Delta V_{east}$ is the groundspeed difference in the earth axis east direction, and $\psi$ is the aircraft heading. The values for $\Delta V_x$ and $\Delta V_y$ are then used in the Long_SPD 605 and Lat_SPD 707 blocks respectively to command the pitch and roll attitudes needed to minimize the relative groundspeed difference during the flat turn.

Figure 9:
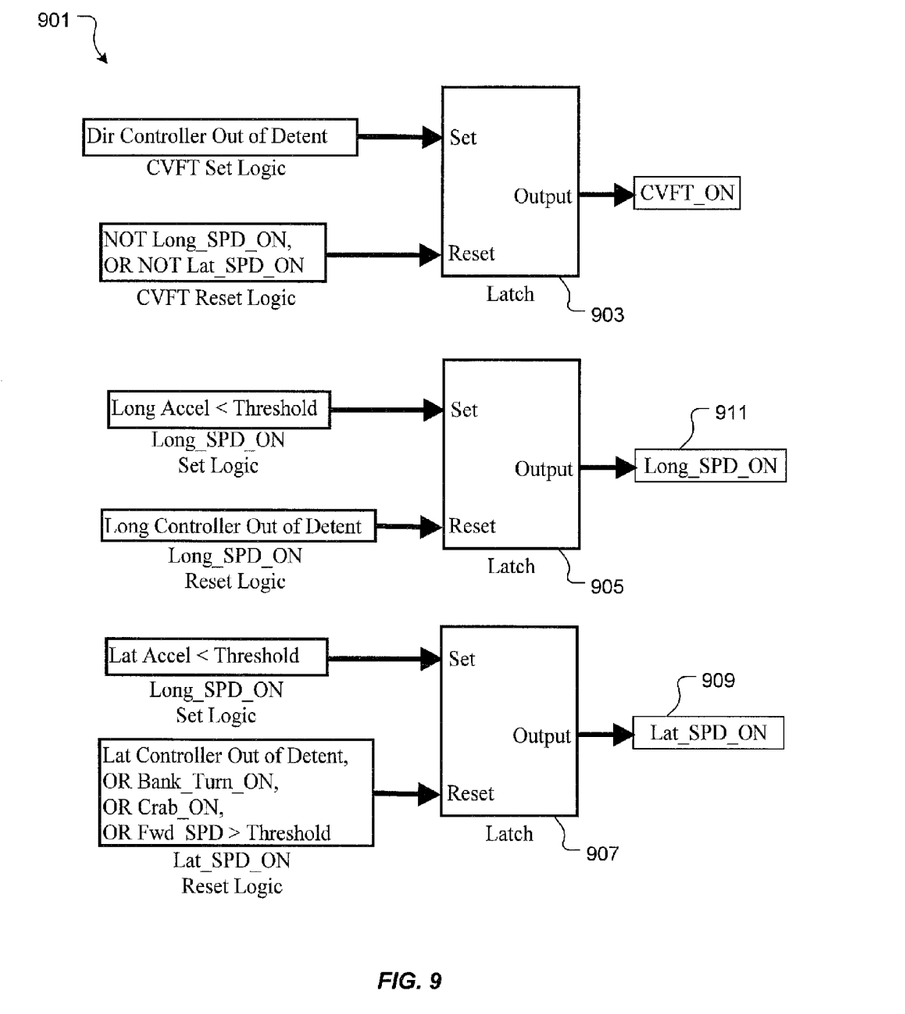
FIG. 9 is a schematic view of the control law logic for the control system.

Referring now to FIG. 9 in the drawings, control law logic 901 for the CVPT mode is shown. Control law logic 901 comprises one or more of latch 903, latch 905, and latch 907 adapted to control when a mode is turned on or off. If the reset conditions are met, then the mode will always be off. If the reset conditions are not met, then the mode will be latched on when the set conditions are met. The CVPT mode will be reset whenever lateral speed hold, depicted as block 909 "Lat_SPD_ON" or a longitudinal speed hold, depicted as block 911 "Long_SPD_ON" are not on and will be set when the directional controller is out of detent.

Both longitudinal latch 905 and lateral speed hold latch 907 will be reset when their respective controller is out of detent. Additionally, the lateral speed hold latch 907 will be reset when the banked turn (Bank_Turn_ON) or crab hold (Crab_ON) modes are on, or if forward speed exceeds the CVPT threshold (typically around 35 KGS). The longitudinal and lateral speed hold latches will be set when their respective acceleration falls below the acceleration threshold (typically around 2 ft/sec$^2$).

Figure 10:
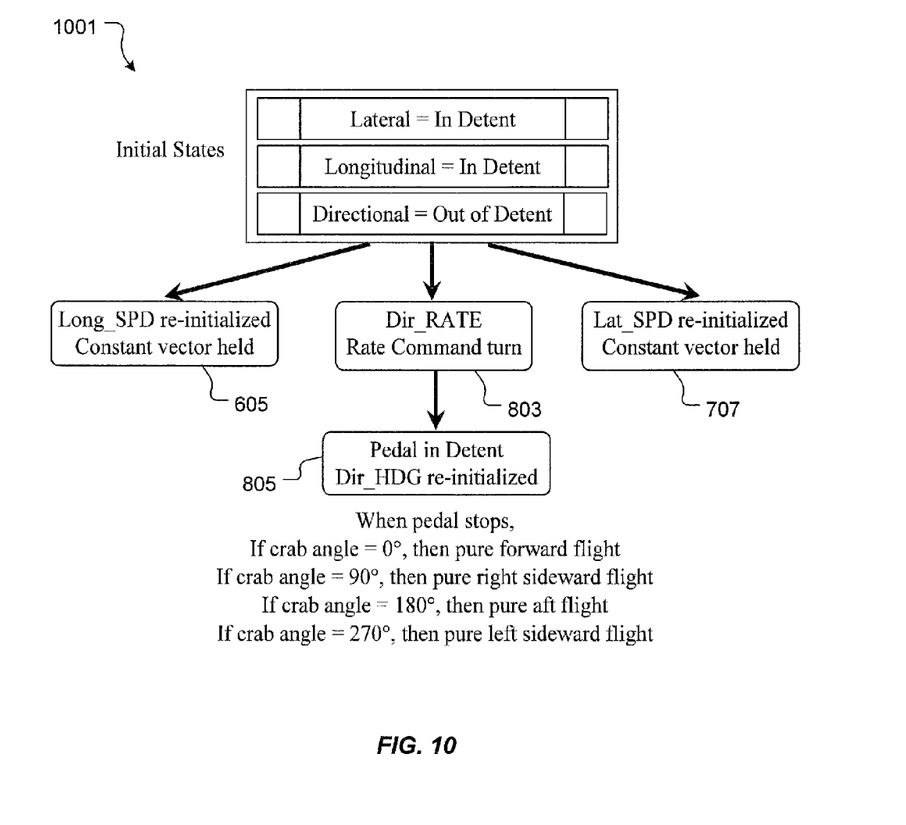
FIG. 10 is a schematic view a control law flow chart for the control system.

Referring now to FIG. 10 in the drawings, a control law flow chart 1001 for a CVFT is presented. When the directional controller is initially moved out of detent, the CVPT mode will be engaged. The longitudinal and lateral speed hold blocks (Long_SPD 605 and Lat_SPD 707) will be reinitialized to feedback the relative groundspeed differences calculated in equations 2 and 3. Once the directional controller is returned to detent following the CVFT, directional control laws will hold heading by re-engaging the Dir_HDG 805 loop. The longitudinal and lateral axes will continue to hold a constant ground vector until the pilot commands a change by moving either the longitudinal or lateral controller out of detent. This design enables the pilot to command and hold any crab angle around the 360 degree circle, while the aircraft continues to move across the ground on a constant vector. As shown, when the pedal stops, if the crab angle equals 0 degrees, then aircraft 201 travels in pure forward flight; if the crab angle is 90 degrees, aircraft 201 travels in pure right side flight; if the crab angle is 180 degrees, then aircraft 201 travels in pure aft flight; and, if the crab angle is 270 degrees, then aircraft 201 travels in pure left sideward flight.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A control system for an aircraft, comprising:
   a lateral control architecture configured to control lateral motion of the aircraft; and
   a longitudinal control architecture configured to control longitudinal motion of the aircraft;
   wherein the control system utilizes the lateral control architecture and the longitudinal control architecture to control yaw movement of the aircraft while the aircraft maintains a constant vector heading across a ground surface; and
   wherein the aircraft continuously moves in a yaw direction while maintaining the constant vector heading.

2. The control system of claim 1, wherein the control system is operably associated with a directional controller manually manipulated by a pilot.

3. The control system of claim 2, further comprising:
   a directional control architecture, having:
      a directional heading control loop;
      a directional turn coordination control loop; and
      a directional yaw rate control loop.

4. The control system of claim 3, further comprising:
   a directional control latch in data communication with the directional control architecture;
   wherein, as the directional controller is moved out of a detent position, the directional control latch activates a constant vector flat turn motion.

5. The control system of claim 1, the lateral control architecture comprising:
   a lateral sideward groundspeed control loop;
   a lateral roll attitude control loop; and
   a lateral roll rate control loop.

6. The control system of claim 5, further comprising:
   a lateral controller carried by the aircraft, the lateral controller being manipulated by a pilot controlling the aircraft, the lateral controller creating a lateral command in data communication with the lateral sideward groundspeed control loop, the lateral roll attitude control loop, and the lateral roll rate control loop.

7. The control system of claim 6, further comprising:
   a lateral control hatch in data communication with the control system;
   wherein, as the lateral controller is moved out of a detent position, the lateral control latch resets a lateral speed hold.

8. The control system of claim 1, the longitudinal control architecture comprising:
   a longitudinal forward speed control loop;
   a longitudinal pitch angle control loop; and
   a longitudinal pitch rate control loop.

9. The control system of claim 8, the longitudinal control architecture further comprising:
  a longitudinal controller carried by the aircraft, the longitudinal controller being manipulated by a pilot controlling the aircraft, the longitudinal controller creating a longitudinal command in data communication with the longitudinal forward speed control loop, the longitudinal pitch angle control loop, and the longitudinal pitch rate control loop.

10. The control system of claim 9, further comprising:
  a longitudinal control hatch in data communication with the control system;
  wherein, as the longitudinal controller is moved out of a detent position, the longitudinal control latch resets a longitudinal speed hold.

11. A method, comprising:
  sensing a directional movement of an aircraft;
  determining lateral and longitudinal movements of the aircraft; and
  selectively controlling flat yaw movement of the aircraft while maintaining a constant vector flat turn relative to a ground surface;
  wherein the aircraft continuously moves in a yaw direction while maintaining the constant vector heading.

12. The method of claim 11, the method further comprising:
  commanding the flat yaw movement with a directional controller manipulated by a pilot controlling the aircraft.

13. The method of claim 12, wherein controlling the flat yaw movement comprises:
  communicating data through a directional heading control loop;
  communicating data through a directional turn coordination control loop; and
  communicating data through a directional yaw rate control loop.

14. The method of claim 12, further comprising:
  activating the constant vector flat turn with a directional control latch as the directional controller is moved out of a detent position.

15. The method of claim 11, wherein determining lateral movements is achieved through the method comprising:
  communicating lateral motion data through a lateral sideward groundspeed control loop;
  communicating lateral motion data through a lateral roll attitude control loop; and
  communicating lateral motion data through a lateral roll rate control loop.

16. The method of claim 11, further comprising:
  controlling lateral movement with a lateral controller manipulated by a pilot controlling the aircraft.

17. The aircraft of claim 16, further comprising:
  resetting a lateral speed hold with a lateral control hatch as the lateral controller is moved out of a detent position.

18. The method of claim 17, wherein controlling longitudinal movement includes the method comprising:
  communicating longitudinal motion data through a longitudinal forward speed control loop;
  communicating longitudinal motion data through a longitudinal pitch angle control loop; and
  communicating longitudinal motion data through a longitudinal pitch rate control loop.

19. The aircraft of claim 11, further comprising:
  controlling longitudinal movement with a longitudinal controller manipulated by a pilot controlling the aircraft.

20. The aircraft of claim 19, further comprising:
  resetting a longitudinal speed hold with a longitudinal control hatch as the longitudinal controller is moved out of a detent position.

* * * * *